(12) United States Patent
Schneider et al.

(10) Patent No.: US 10,090,737 B2
(45) Date of Patent: Oct. 2, 2018

(54) STATOR WITH GROUND CONTACT

(71) Applicant: Minebea Co., Ltd., Nagano-ken (JP)

(72) Inventors: Helmut Schneider, Zimmern-Flozlingen (DE); Jurgen Schill, Bad Durrheim (DE)

(73) Assignee: MINEBEA MITSUMI INC., Nagano (JP)

( * ) Notice: Subject to any disclaimer, the term of this patent is extended or adjusted under 35 U.S.C. 154(b) by 672 days.

(21) Appl. No.: 14/297,985

(22) Filed: Jun. 6, 2014

(65) Prior Publication Data
US 2014/0361650 A1 Dec. 11, 2014

(30) Foreign Application Priority Data
Jun. 7, 2013 (DE) .................. 10 2013 105 965

(51) Int. Cl.
*H02K 5/08* (2006.01)
*H02K 11/40* (2016.01)
*H02K 11/00* (2016.01)

(52) U.S. Cl.
CPC ........... *H02K 11/0089* (2013.01); *H02K 5/08* (2013.01); *H02K 11/40* (2016.01)

(58) Field of Classification Search
CPC ...... H02K 5/08; H02K 11/00; H02K 11/0089; H02K 11/01; H02K 11/02; H02K 11/40
USPC .............. 310/71, 216.105, 216.115, 216.128
See application file for complete search history.

(56) References Cited

U.S. PATENT DOCUMENTS

| 5,965,966 | A  | * | 10/1999 | Aiello ...... | H02K 11/40 310/216.121 |
| 6,740,999 | B1 | * | 5/2004 | Segawa ...... | H02K 5/00 310/71 |
| 6,987,338 | B1 | * | 1/2006 | Lavasser ...... | A47L 5/12 15/412 |
| 2001/0017495 | A1 | * | 8/2001 | Sato ...... | H02K 5/15 310/67 R |
| 2005/0275297 | A1 | * | 12/2005 | Suzuki ...... | H02K 5/225 310/71 |
| 2010/0323552 | A1 | * | 12/2010 | Chaumet ...... | H02K 5/148 439/426 |
| 2011/0234025 | A1 | * | 9/2011 | Kado ...... | H02K 5/08 310/43 |

* cited by examiner

*Primary Examiner* — Thomas Truong
*Assistant Examiner* — Minki Chang
(74) *Attorney, Agent, or Firm* — Volpe and Koenig, P.C.

(57) ABSTRACT

A stator for an electrical machine with a stator body (2, 102) and a ground contact (3, 103) which is electrically connected to the stator body, wherein the stator body is arranged in a motor housing (4, 104), which is formed from plastic material. In order to have a compact stator that is easy to install and at the same time has a reliable contact to a ground contact, it is provided that the motor housing has a stator holder (7, 107), which receives the stator body in the operating position, and is located on the inner surface of at least one of its housing parts, and to arrange and fix the ground contact at the inner circumference of the stator holder, facing the stator body, so that the stator body can be electronically contacted by the ground contact.

12 Claims, 5 Drawing Sheets

A-A

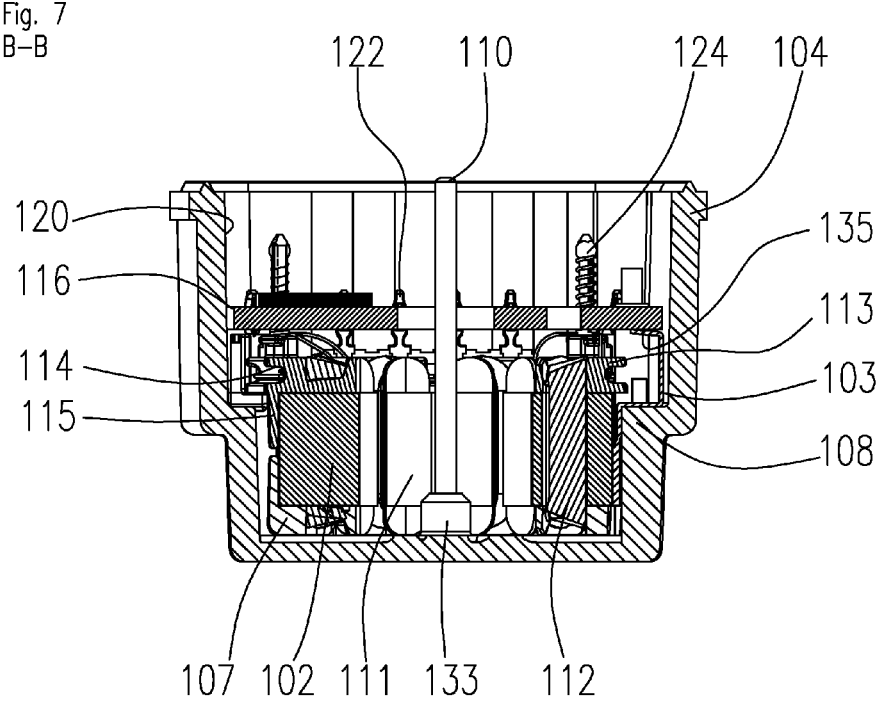

STATOR WITH GROUND CONTACT

INCORPORATION BY REFERENCE

The following documents are incorporated herein by reference as if fully set forth: German Patent application No. DE 10 2013 105 965.1, filed Jun. 7, 2013.

BACKGROUND

The invention relates to a stator for an electric machine, having a stator body and a ground contact which is electronically connected to the stator body, where the stator body is arranged in a motor housing made of plastic material.

When using small electric drives, the electromagnetic compatibility frequently plays a role in regards to other electrical equipment. Through the radiation produced by the alternating electromagnetic field during the commutation of electric motors, a sender is built that is able to disrupt other mechanisms. The perturbation potential could be mitigated by adding a metallic housing around the motor, which is a measure that is associated with additional weight and a not insignificant rise in costs.

Therefore it is mandatory in many applications that the stator body of the stator can be electrically grounded. This is normally done via a ground contact, which can, for example, be found directly on the stator body or arranged in the area of the slot insulation and, if applicable, is also accessible outside the motor housing. The ground contact or a grounding wire is, for example, bolted or welded to the stator body. However, this type of fastening extends beyond the outer periphery of the stator body, which makes the installation in a motor housing more difficult, or, as the case may be, that additional space is required. Through the increased size of the stator, it is possible that the motor in which it is located is also too large to be suitable for certain applications.

SUMMARY

The objective of the invention is therefore to provide a stator of the aforementioned type, which is more compactly and easily built, while simultaneously permitting a safe connection between the stator and the grounding.

According to the invention, this is achieved through a stator of the aforementioned type, in which at least one of the housing parts located on the inner wall of the motor housing exhibits a stator holder, in which the stator body is located in the operating position, and that the ground contact of the stator body is placed and fixed facing the inner circumference of the stator holder and that it electrically contacts the outer circumference of the stator body.

The stator, according to the invention, is arranged such that its ground contact is located between the stator body and the stator's motor housing stator holder, and the ground contact touches the stator body as soon as the stator body is added to the stator holder. Through this, the stator body is conductively contacted by the ground contact.

In a favorable embodiment of the stator according to the invention, the ground contact can, through its free end, resiliently contact the electronic component carriers arranged in the motor housing, such as a circuit board structure (printed circuit board). Therefore, the contact in question can be easily established through the arrangement of a circuit board in the motor housing. In particular, an electrical contact can thus be prepared and maintained between the circuit board and the pre-stressed portion of the ground contact. For instance, the circuit board or printed circuit board, presses a contact surface against the ground contact with its free end. For example, this contact surface has a surface area between 1 mm$^2$ and 30 mm$^2$, and preferably between 8 mm$^2$ and 16 mm$^2$.

For the insulation of the stator body, an insulating layer can be added, that, for example, by means of an immersion process on the stator body, preferably formed from a stack of mutually contacted sheets, so that in further developments of the stator according to the invention, the ground contact is provided with at least one cutting element, that, as the case may be, cuts through the stator body's insulation layer.

In this case, at least one contact surface contacting the stator may be provided for the cutting element, particularly, the cutting element can form the contact surface. To this, a cutter from the cutting element can, for example, recreate the radius of the outer periphery of the stator body, so that the cutter can contact the stator body at two or more points in the circumferential direction.

In order to have enough tolerance and/or flexibility in the arrangement of the stator body in the contact and simultaneously make sure that the contact is reliable, the ground contact is made flexible in some advantageous embodiments of the stator and, in particular, can be biased from the inner circumference of the stator holder inside the housing towards the stator body. In this context, an embodiment of the stator is preferred in which the ground contact is produced out of an electrically conductive metal, in particular out of metal, in particular a spring steel, and has at least one curved or repeatedly curved section that, in the usage position, is bent towards the stator body. In particular, the curved section can be preferably formed out of metal, in particular a spring steel. Through said curvature or multiple bending, the ground contact can, for example, be formed like a tongue with two wing-like side sections that do not necessarily need to have the same curvature in regards to a straight tongue piece and do not need to have the same form. In this way, the ground contact is able to follow the radius of the outer periphery of the stator body and can ensure that at least one area, preferably two or more areas, of the ground contact has an electrically conductive contact to the stator body. In particular, in an embodiment with these aforementioned wing-like side sections, the wing-like sections are able to contact the side sections of the stator body and ensure a grounding contact. Through the multiple executions of the side sections, a redundancy is found in the grounding function and the probability of a failure of the ground is substantially reduced. The side sections of the spring contacts, as well as the contact section on the free end of the ground contact for the electric contact with the circuit board, can be coated with a particularly conductive metal, so that the electrical interface resistance between the stator and the ground contact and between the circuit board and ground contact can be further reduced. As a result of this coating, the grounding function is further optimized. In particular, the contact sections may also be made of a corrosion-resistant material, rather a corrosion-resistant finish or coating, so that the grounding function is maintained throughout the life of the electric motor having a stator according to the invention. For spring steel, a chromium-nickel alloy spring steel (spring wire/spring band) can be used, in particular spring steel having an elastic modulus between 1.8*10$^5$ N/mm$^2$ and 2.0*10$^5$ N/mm$^2$ at 20° Celsius.

The ground contact can, through another embodiment of the stator, be positioned particularly well in the stator body area, when it is placed facing the inner circumference of the stator body that is designed as a stator holder forming of the housing, in particular in a further designated retainer for the ground contact.

Such a retainer for the ground contact can be, in a preferred development, formed through an undercut, slot, or pocket. The ground contact's retainer is then arranged in the area of the stator holder, wherein the ground contact, with at least one cutting element, points in the direction of the stator body. In particular, the retainer for the ground contact may be formed such that it is open in the direction of the inner circumference of the stator holder, in particular in the direction of the outer circumference of the stator, so that at least one cutting element from the ground contact has electrical contact with the stator. The stator holder can, for example, have a pocket or be interrupted along the circumference in order to have a place for the ground contact. The ground contact retainer can then, at least partially, be modeled as a recess that resembles the shape of the contact. Furthermore, the holder can have a base upon which the ground contact rests. The formation of a stator holder and/or the inclusion of the ground contact is preferably formed integrally with the motor housing, in particular when the motor housing is manufactured as a plastic injection-molded part.

The grounding of the stator body, as indicated above, is essentially ensured by the reliable positioning of the ground contact, so that in a preferred development of the stator according to the invention in the area of the stator holder at least one holding means is provided, which, in particular, prevents the ground contact from a tangential movement along the circumference of the stator holder and/or a movement in the radial direction of the stator holder.

In a preferred embodiment, these fastening means can be formed through a wall portion of a slot, through which, for example, the grounding contact is conducted, or through a pole that is located closer to the stator body, or through projections on the front edge. Such a pole (or a protrusion or strut) can, for example, be arranged parallel to the axial extension of the stator in such a way that it is gripped by, for example, two cutting elements of the ground contact. Recesses may form at the bottom of the housing of the ground contact in which the cutter is mounted, at which the cutting surfaces of their cutting elements protrude from the recesses in the direction of the stator.

The fastening means are adapted to keep the ground contact in position. In particular, in spite of and during the mechanical impingement on the stator body assembly, these fastening means suitably hold the ground contact in position. In addition, adhesive bonding can also be used to fix the ground contact within the stator holder.

The ground contact may be supported through the bottom piece of the receptacle in a further embodiment in which the said receptacle is spaced from the bottom of the stator holder in the axial direction so that the ground contact is axially supported and that no undesired movements occur along the outer periphery of the stator running in the axial direction. Likewise, through being partially covered by other components, such as formations on the motor housing, possible movement of the ground contact can be prevented.

In a particularly favorable embodiment of the invention, the stator is made from stacked individual stator sheets. The stator sheets are generally punched. To ensure secure electrical contact between all stator sheets, it is beneficial if the stator sheets are electrically connected to each other. In a preferred embodiment of the inventions, each stator sheet has at least two interlocking knobs, and on the other side of the sheet has complementary recesses. When the stator body is stacked, the interlocking knobs from the stator sheets grip into the recesses of the next stator sheet, which ensures an electrical connection between all the stator sheets. The stator according to the invention is in principle suitable for all electric machines. The stator according to the invention is particularly advantageous when used in an electric motor, for example a brushless DC motor.

A favorable embodiment of an electric motor consists of a stator according to the invention, a rotor, and motor housing. The motor housing is preferably injection molded from plastic. Moreover, in a favorable embodiment of the stator body, the stator can be provided with an insulating coating due to the use of a dipping method. This insulating coating is ideally applied as a thin layer, for example in the form of a lacquer or a resin (epoxy resin). Preferably, the insulation is done by an electrochemical coating process, such as cathodic dip painting or other electrochemical methods of application (electrochemical deposition). The thickness of the insulation is, for example, some 10 μm, and preferably between 0.045 mm and 0.05 mm. Thus, the stator according to the invention can be reliably penetrated by the ground contact and an electrical contact between the two can be produced.

BRIEF DESCRIPTION OF THE DRAWINGS

The invention is explained below with reference to the drawings, illustrated in exemplary embodiments. Shown in partial schematic form are:

FIG. 7 a sectional side view of the motor housing from FIG. 6 along section line B-B.

DETAILED DESCRIPTION OF THE PREFERRED EMBODIMENT

Figure 1:
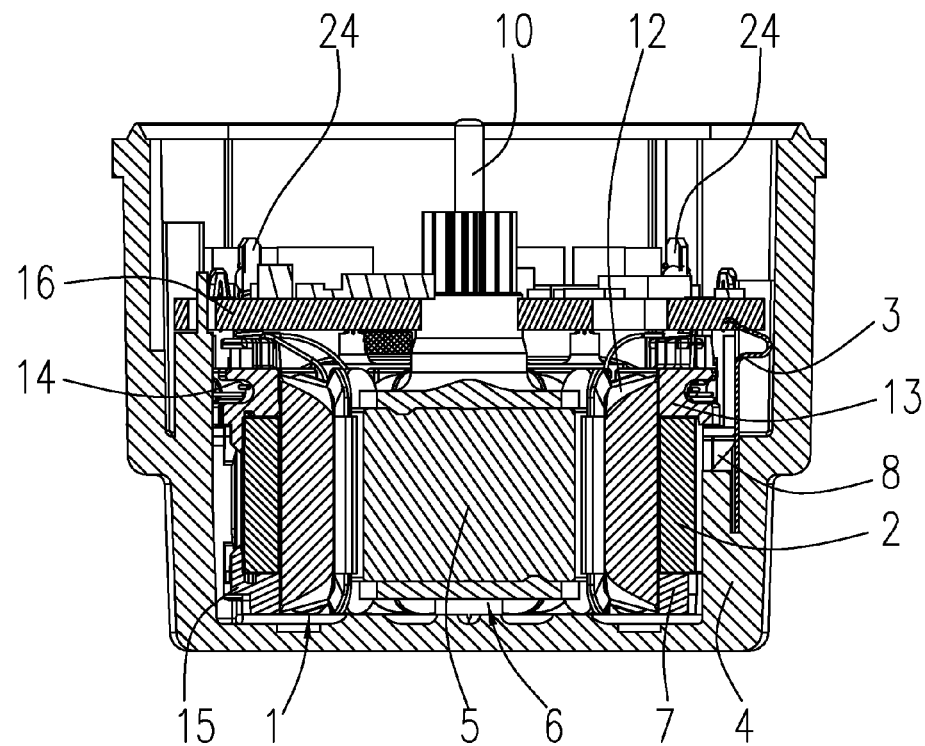
FIG. 1 a first embodiment wherein a sectional side view of an electric motor with the stator according to the invention with the ground contact, the rotor, and the motor housing is seen.

In FIGS. 1, 5, 6 and 7, a stator made for an electrical machine, that is designated as a whole with 1, can be seen. The stator has a stator body 2, 102 and a ground contact 3, 103 that is electrically connected to the stator body 2, 102, where the stator body 2, 102 is arranged in motor housing 4, 104 made of plastic materials, which may be prepared, for example, by injection molding. Together with the rotor 5 seen in FIGS. 1 and 5, the electric motor 6 is, in this case, designed as an inner rotor type, wherein the rotor 5 can be rotated and supported on an axis 10 within the stator 1. However, the invention is also applicable to an outer rotor type electric motor.

In FIGS. 1, 5, 6 and 7, the stator 1 exhibits a stator body 2, 102 made of separately stacked stator sheets with multiple poles 11, 111. At the front edge of the stator body 2, 102 is an insulation made of plastic that isolates the wires of the stator winding 12, 112 the stator pole 11, 111, and, if applicable, can reach into the stator slots between the stator poles 11, 111. The insulation is formed, for example, through two insulation adaptors 13, 113, which are arranged on one end face of the stator body 2, 102 and project over the stator poles 11, 111. The insulation adaptors 13, 113 are preferably produced through an injection molding process, and can simply be set on top of the stator body 2, 102. The insulation adaptors 13, 113, suitably have about the same outer diameter as the stator body, 2, 102, and have guide grooves 14, 114 in which the wires of the stator windings 12, 112 are lead through. They are also held in position through a tongue-shaped fastening means adaptor 15, 115 on the stator body 2, 102. In addition to the insulation adaptor 13, 113, the stator body is preferably coated with a thin insulation layer, preferably applied in an electrochemical immersion method, so that electrical contact with the stator winding is effectively prevented.

At the stator 1 according to the invention the motor housing 4, 104 exhibits at an inner wall 20, 120 of one of its enclosure parts a stator holder 7, 107, in which the stator body 2, 102 is arranged in its usage position. The ground contact 3, 103, of the stator body 2, 102 is arranged and fixed facing the inner circumference of the stator holder 7, 107 and electrically contacts the stator body's 2, 102 outer circumference. The insulation adaptors 13, 113 of the stator body can project in a radial direction over the stator body and are provided with holes, so that the stator body 2 can be fixed through screwing or hot stamping to the stator holder 7, 107. The stator holder 7, 107 for the stator can have corresponding recesses or holes.

Figure 2:
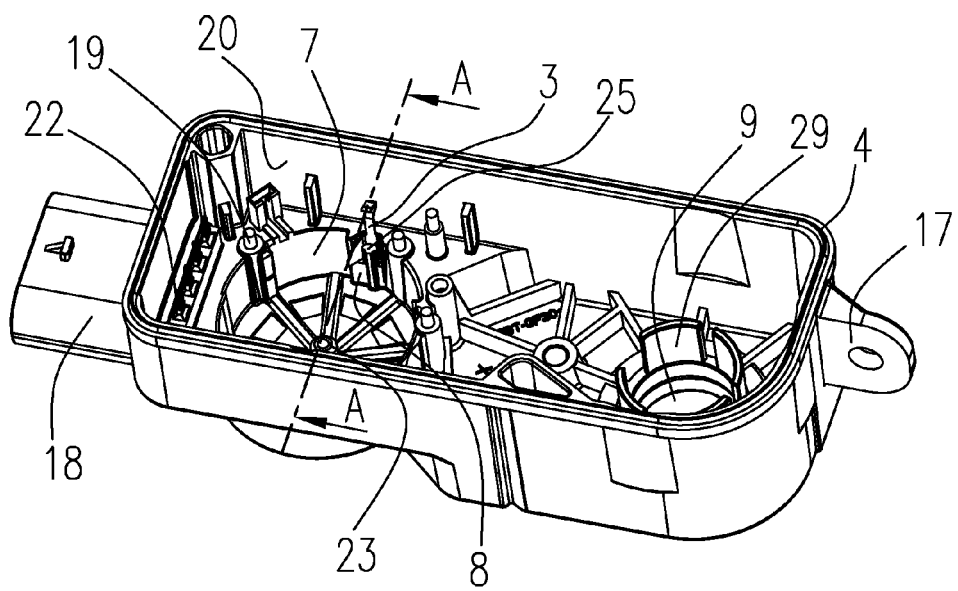
FIG. 2 a perspective view of an open motor housing without the stator, rotor, and circuit board.
Figure 3:
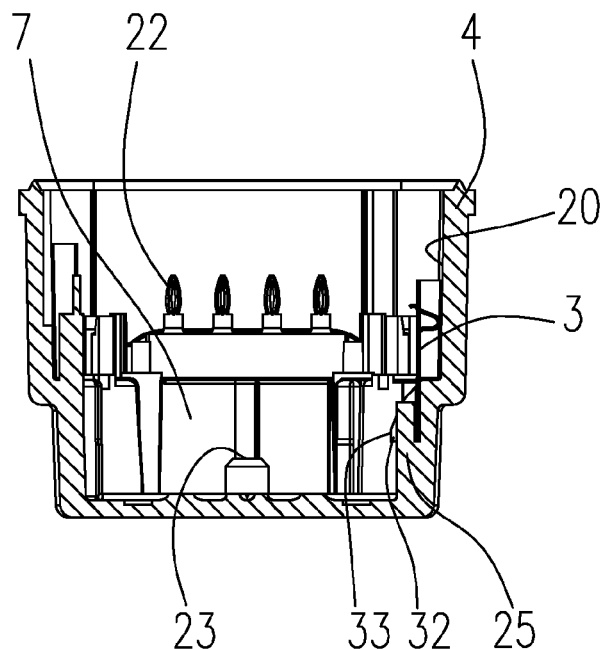
FIG. 3 a sectional side view of the motor housing of FIG. 2 along the section line A-A.
Figure 4:
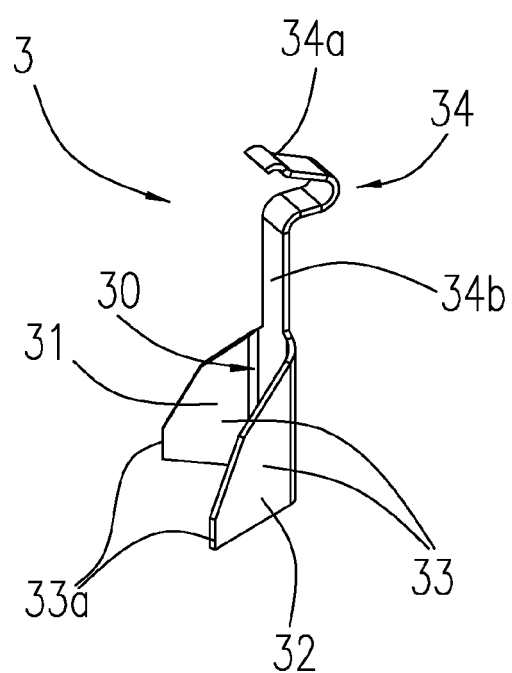
FIG. 4 a side perspective view of the ground contact of the FIGS. 1 through 3.

Such a ground contact 3, made out of spring steel can, for example, be found in detail in FIG. 4 and in the illustrations of FIG. 1 through 3, as well as 5 through 7, located in the inner surface motor housing 20. The ground contact 3 has two curved blades 31, 32 located at one of the ground contact's 3 ends that are bent towards the stator body 2 when the ground contact 3 is in its usage position. Each of the curved blades 31, 32 has one cutting element 33 that, when arranged by the stator, cuts through the stator's insulation layer. The cutting element 33 exhibits contact regions 33*a* which provide the electrical contact with the stator. The blades 31, 32 build a curved area 30 together with the section where they are formed. At the upper end that is seen, the ground contact 3 exhibits a two-legged, v-formed end section 34, which, when acted upon by a circuit board 16, is pressed together and through this is able to hold the contact to the circuit board 16. The ground contact 3 exhibits one or more contact sections 34*a* or contact surfaces, that, for example, are pressed against or are elsewise (for example by soldering, welding, or clamping) electrically connected to the corresponding contact regions on the circuit board 16. However, the at least one contact section 34*a* does not necessarily need to be located at the end section 34, but can also be in the area of a connecter 34*b* between the end section 34 and the cutting element 33.

The motor housing can be seen in FIG. 2, and is shown here without the stator 1 for the sake of clarity. In such a way it is easier to recognize the stator holder 7, in which the stator is arranged, and a retainer 8 that receives the ground contact 3 at the inner circumference of the stator holder 7. Similarly, an axial pole 25 is located there that serves as a fastening element for the ground contact 3 to recognize, as well as a base upon which the ground contact sits. Moreover, the cross-section of the stator holder in the interior of the motor housing 4 springs back. Further, FIG. 2 shows a passage 9 to the motor housing, in which a output shaft (not shown) can be mounted. On the right side of the motor housing 4, a pin loop 17 for fastening the same can be found and, at the opposite side (the right side in this view) an adaptor 18 for electrically connecting the electric motor can be found. Finally, one can see plugs 19 in the region of the stator holder's 7 front face, which can, when engaged, grip the loops 21 of the insulation adaptors 13 and thereby fix the stator body 2 in position.

Further seen in FIG. 2, the left end portion of the motor housing 4 has four electrical contacts 22, which are led out of the adaptor into the housing interior. These electrical contacts 22 are better seen in FIG. 3, as well as the shaft support 23 for the shaft 10, which supports the rotor 5 in the assembled state of the electric motor 6. In particular the ground contact 3 with its blades 31, 32 of the cutting element 33 that contacts the stator body 2 that is not illustrated in FIG. 3 is seen. Similarly to the shaft support 23 supporting the drive shaft of the electric motor 6, there are various axle supports formed in the motor housing 4, 104 that support the axles of various gear-wheels of a gear-train (for example of a transmission gearing). There is an inwardly directed collar, formed concentrically around the openings in the housing bottom and housing cover through the passage 9, 109, that forms a bearing surface 29 that supports an output shaft, not shown, of the gear train. These axis and shaft support are reinforced through bushes molded into the housing struts, which extend substantially in a radial direction of the respective receptacle.

Figure 5:
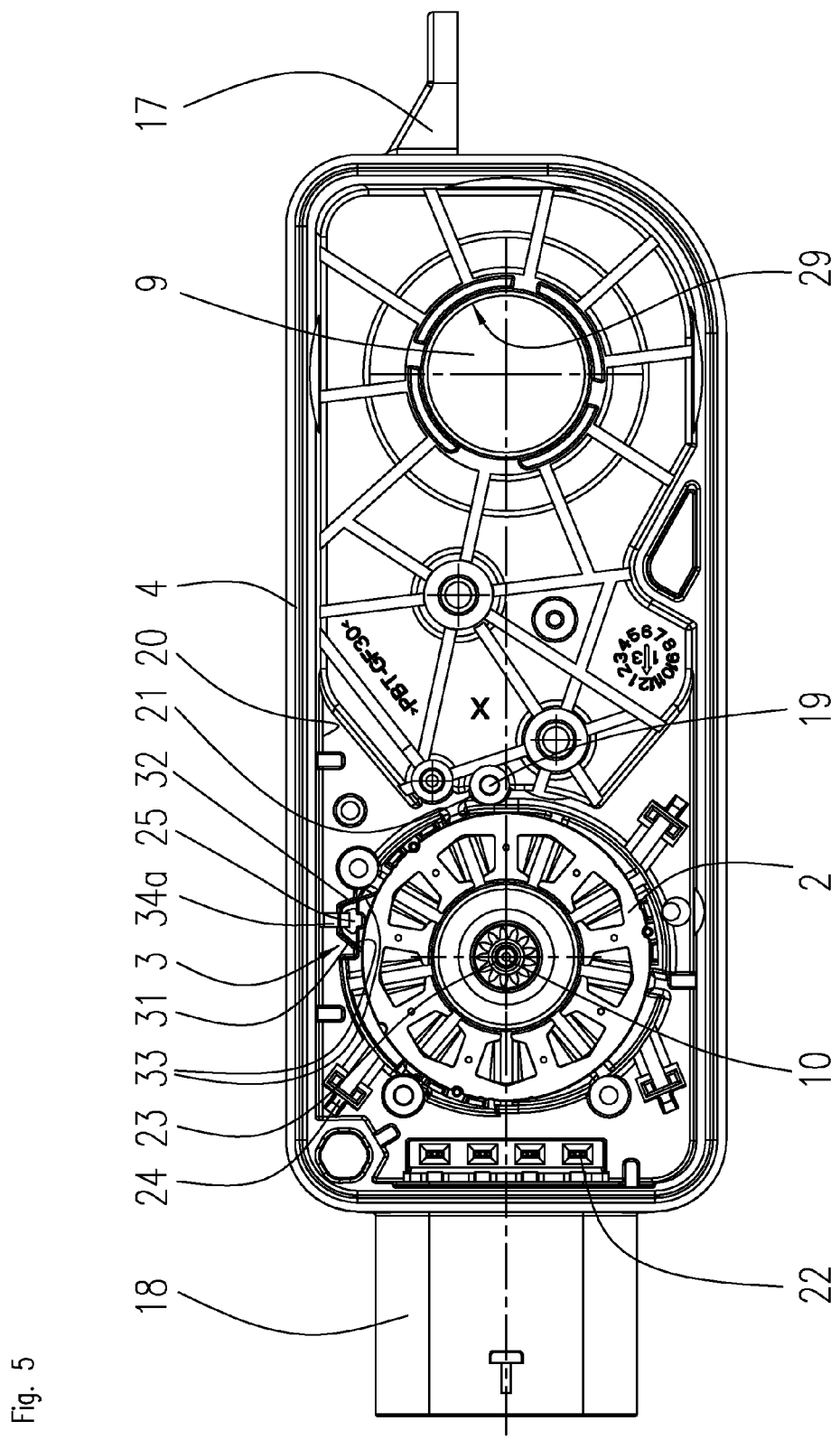
FIG. 5 a top plan view from above of the motor housing with stator according to the invention and the ground contact.

In FIG. 5 is a top plan view of the motor housing shown in FIG. 2, in which the circuit board 16 and the insulation adaptor 13 are not shown, so that the stator body 2 of the stator 1, together with the stator body's ground contact 3 can be seen best. Here it is also illustrated how the cutter 33, with its blades 31, 32, contacts the stator body 2 in order to produce an electrical contact. Also, the contact surface, or rather the contact section 34*a* of the ground contact 3, can be seen contacting the circuit board 16.

Figure 6:
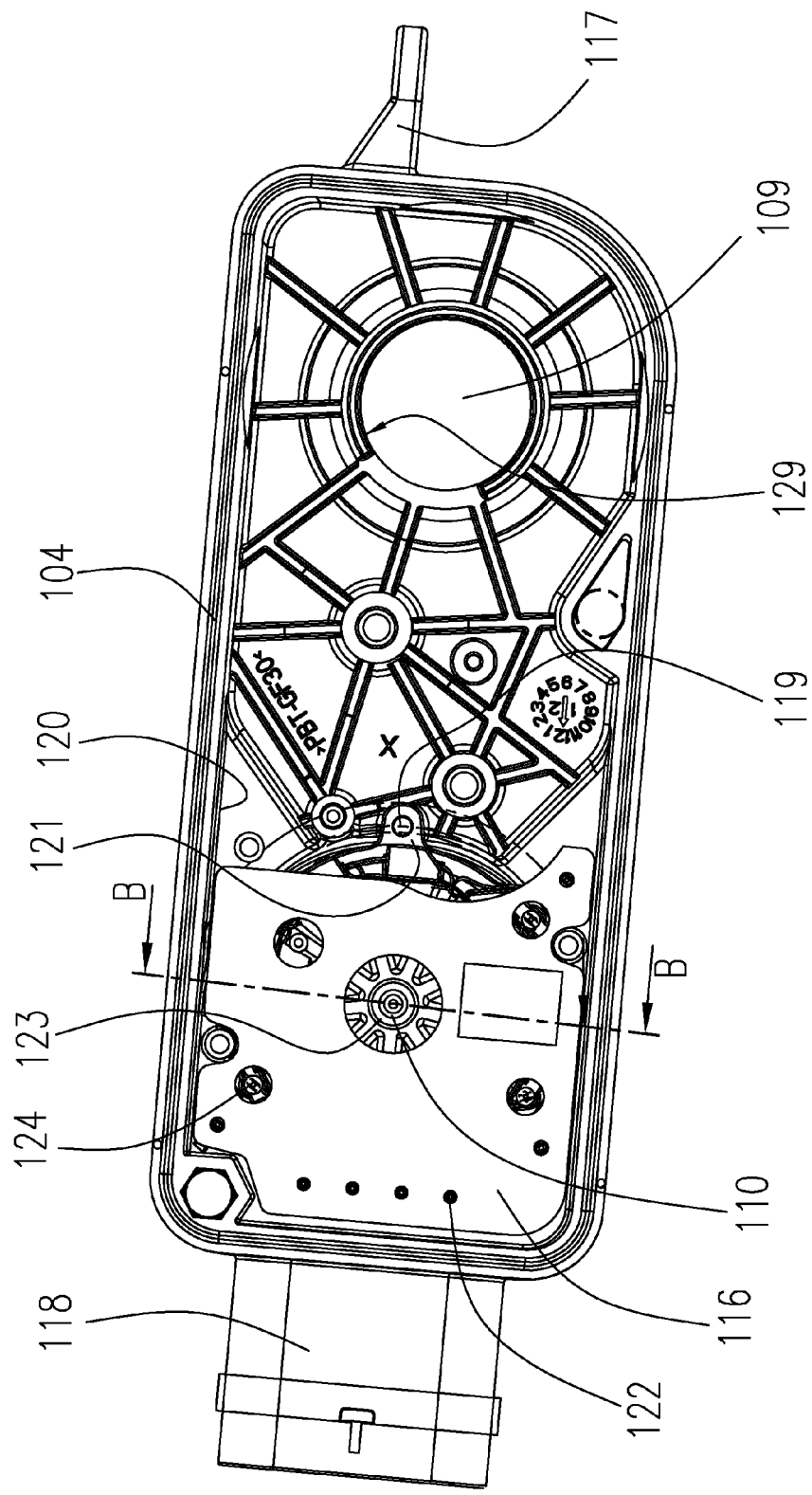
FIG. 6 a top plan view of the motor housing of a second embodiment with the stator and circuit board disposed therein.

FIG. 6 is very similar to FIG. 2 and also shows stator 1, which, along with the stator holder 107 and stator body 102, is located in the motor housing 104. FIG. 6 illustrates the location of the circuit board 116 over the stator 1 and the ground contact 103. The circuit board 116 in FIGS. 6 and 7 produces that electrical connection between the electric contacts 122 and the contact pins 124. In this illustration, it can clearly be seen that the circuit board has various openings so that the shaft 10 of the electric motor 6, as well as the pins of the electric contacts 122, can be connected with an external electric supply and motor control. Through these further openings, clamps and crimps can be available for the contact pins during the electric phases of the stator winding, as well as using, for example, hot stamping to fix the mounting holes of the circuit board 116 to the motor housing 104. Through such a fastening of the circuit board 116, it is ensured that the ground contact 103 and its contact surface are reliably pressed against the circuit board 116, so that the ground contact is fixed in an axial direction (parallel to the axial direction of the shaft 110) and that the electric contact is provided between the ground contact 103, circuit board 116, and the stator 1. In comparison to the variant previously shown, the motor housing 104 has slight modifications. For example, through the collar-shaped bearing surface 129 of the motor housing 104, the motor housing 104 is designed differently for a drive shaft (not shown). Here, through multiple openings arranged concentrically to the housing opening, the bearing surface is defined as part of the collar.

The ground contact 103 is also made out of corrosion-resistant spring steel and contacts the circuit board 116 from below, and though the upper end is not V-shaped, but rather follows the contour of the motor housing's 104 inner wall and bends directly under the circuit board 116 in the direction of the interior housing. The upper end of the ground contact 103 is pressed against the circuit board's tongue 135. The tongue 135 again clasps a contact surface for the electrical contact with the circuit board 116 and the cutter 33 of the ground contact 103 essentially corresponds to the cutter 33 of the ground contact 3 shown in FIG. 4. Accordingly, the receptacle for the ground contact found in the motor housing is formed differently and is based on this contour. In this embodiment and view, the ground contact is shown through a cross-section in the form of a step or a ledge.

Accordingly, the above-described inventions relates to a stator 1 for a electrical machine 6 with a stator body 2, 102 and a ground contact 3, 103 that is electrically connected to the stator body 2, 102, while the stator body 2, 102 is located in a motor housing 4, 10 molded out of plastic material. In order to have a compact stator 1 that is easy to install and at the same time has a reliable contact to a ground contact, a proposal is that the motor housing 4, 104 has at least one of its housing parts with a stator holder 7, 107 located on the inner surface of the motor housing 2, 102, where the stator body 2, 102 is in the operating position and the ground contact (3, 103) is arranged and fixed by the stator body (2, 102) and facing the inner circumference of the stator holder (7, 107) so that the stator body (2, 102) can be electronically contacted by the ground contact (3, 103).

REFERENCE NUMERAL

1—Stator
2, 102—Stator body
3, 103—ground contact
4, 104—motor housing
5—rotor
6—electric motor
7, 107—stator holder
8, 108—retainer
9, 109—passage
10, 110—axis
11, 111—stator pole
12, 112—stator winding
13, 113—insulation adaptor
14, 114—guide groove
15, 115—fastening means adaptor
16, 116—circuit board
17, 117—pin loop
18, 118—adaptor
19, 119—plug
20, 120—inner surface motor housing
21, 121—loop
22, 122—electric contact
23, 123—shaft support
24, 124—contact pins
25, 125—axial pole
29, 129—bearing surface
30, 130—curved area
31, 32—blades
33—cutting element
33a—contact region of the cutter
34, 134—end section
34a—contact section
34b—connecter
135—tongue

The invention claimed is:

1. A stator for an electric machine comprising:
a stator body (2, 102),
a ground contact (3, 103) that is electrically connected with the stator body (2, 102) and provided with at least one cutting element (33) having a contact surface (33a) that electrically contacts the stator body by cutting through an insulation layer of the stator body (2, 102),
a motor housing (4, 104) in which the stator body (2, 102) is located, the motor housing (4, 104) is made of plastic material and includes housing parts, a stator holder (7, 107) provided on an inner wall of at least one of the housing parts, the stator holder is formed integrally with the motor housing, the ground contact (3, 103) is arranged and fixed inside the motor housing (4, 104) in a retainer (8, 108) of the stator holder (7, 107) so that the contact surface (33a) of the ground contact's cutting element (33) is electrically connected with the stator body (2, 102) on an outer circumference of the stator body (2, 102),
wherein in a region of the retainer (8, 108) at least one fastening element is provided which prevents the ground contact (3, 103) from moving in at least one of a tangential or radial direction along a circumference of the stator holder (7, 107), and
the fastening element is formed as: (i) a wall portion of a slot, or (ii) an axial pole (25) that is located closer to the stator body, or (iii) projections at a front edge of the holder (8, 108).

2. The stator according to claim 1, wherein the ground contact (3, 103) has at least one contact section (34a) that elastically contacts an electronic component carrier or a circuit board (16, 116) arranged within the motor housing (4, 104).

3. The stator according to claim 1, wherein the ground contact (3, 103) is flexible.

4. The stator according to claim 1, wherein the ground contact (3, 103) is biased in a direction of the stator body (2, 102).

5. The stator according to claim 1, wherein the ground contact (3, 103) is made of spring steel.

6. The stator according to claim 1, wherein the ground contact (3, 103) is provided with at least one curved or repeatedly curved section that is bent towards the stator body.

7. The stator according to claim 1, wherein the ground contact (3, 103) is arranged on an inner circumference of the stator holder (7, 107).

8. The stator according to claim 1, wherein the retainer (8, 108) is formed by an undercut, a slot, or a pocket.

9. The stator according to one of the claim 1, wherein the retainer (8, 108) comprises a base piece, which supports a bottom end of the ground contact (3, 103) spaced apart from a bottom of the stator holder (7, 107) in axial direction.

10. The stator according to claim 1, wherein the stator body (2, 102) is provided with an electrically insulating coating.

11. An electric motor with a stator according to claim 1.

12. A drive unit with an electric motor according to claim 11.

* * * * *